(12) United States Patent
Mulye et al.

(10) Patent No.: US 10,502,171 B2
(45) Date of Patent: Dec. 10, 2019

(54) LIQUID INJECTOR ATOMIZER WITH COLLIDING JETS

(71) Applicant: NOSTRUM ENERGY PTE. LTD., Singapore (SG)

(72) Inventors: Nirmal Mulye, Kendall Park, NJ (US); Shrikrishna Sane, Mumbai (IN); Osanan L. Barros Neto, Commerce Township, MI (US)

(73) Assignee: NOSTRUM ENERGY PTE. LTD., Singapore (SG)

( * ) Notice: Subject to any disclaimer, the term of this patent is extended or adjusted under 35 U.S.C. 154(b) by 305 days.

(21) Appl. No.: 14/646,266

(22) PCT Filed: Nov. 20, 2013

(86) PCT No.: PCT/IB2013/002592
§ 371 (c)(1),
(2) Date: May 20, 2015

(87) PCT Pub. No.: WO2014/080265
PCT Pub. Date: May 30, 2014

(65) Prior Publication Data
US 2015/0330348 A1    Nov. 19, 2015

Related U.S. Application Data

(60) Provisional application No. 61/728,525, filed on Nov. 20, 2012, provisional application No. 61/838,675,
(Continued)

(51) Int. Cl.
*F02M 55/00* (2006.01)
*F02M 61/18* (2006.01)
(Continued)

(52) U.S. Cl.
CPC ......... *F02M 61/1813* (2013.01); *B23P 15/00* (2013.01); *F02M 55/008* (2013.01); *F02M 63/0026* (2013.01); *Y10T 29/49421* (2015.01)

(58) Field of Classification Search
CPC ............. F02M 61/1813; F02M 55/008; F02M 63/0026; B23P 15/00; Y10T 29/49421
(Continued)

(56) References Cited

U.S. PATENT DOCUMENTS

| | | | |
|---|---|---|---|
| 4,595,144 A * | 6/1986 | Wiegand | F02M 61/182 |
| | | | 239/408 |
| 5,080,286 A * | 1/1992 | Morrison | B05B 1/323 |
| | | | 239/533.13 |

(Continued)

FOREIGN PATENT DOCUMENTS

| | | |
|---|---|---|
| CN | 101631950 A | 1/2010 |
| EP | 0 152 775 A2 | 8/1985 |

(Continued)

OTHER PUBLICATIONS

Notification of First Office Action and Search Report issued in Chinese Application No. 2013800708466 dated Jan. 23, 2017.
(Continued)

*Primary Examiner* — Darren W Gorman
(74) *Attorney, Agent, or Firm* — Scully Scott Murphy and Presser; Tanzina Chowdhury

(57) ABSTRACT

A liquid injector for injection of liquids into internal combustion engines is provided. The injectors have a plurality of jets aimed at a common collision point, where at least two jet streams collide to create a finely atomized liquid due to kinetic energy dissipated by the impact of the liquid streams. The angle formed by the jets, the pressure applied and the distance at which the jets collide is such that the loss of forward momentum is greater than the energy required to
(Continued)

Figure 1A:
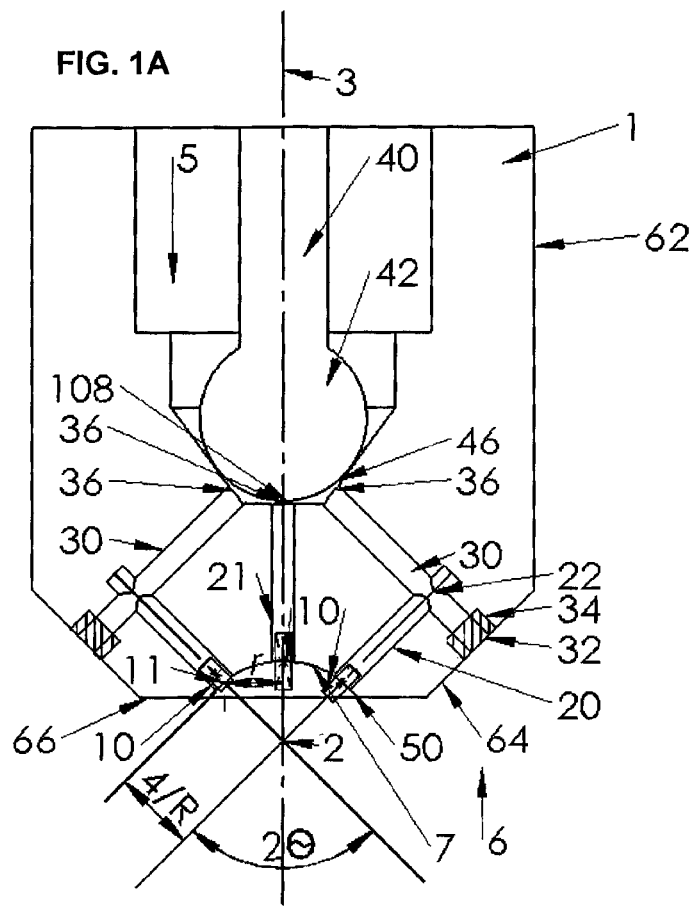

create particles smaller than 5 microns. Liquids injected may include gasoline, diesel-type fuels, or water. The injectors may be employed for port injection or direct injection.

28 Claims, 9 Drawing Sheets

Related U.S. Application Data filed on Jun. 24, 2013, provisional application No. 61/891,118, filed on Oct. 15, 2013.

(51) Int. Cl.
*F02M 63/00* (2006.01)
*B23P 15/00* (2006.01)

(58) Field of Classification Search
USPC .............. 239/543, 533.12, 533.14, 544, 545
See application file for complete search history.

(56) References Cited

U.S. PATENT DOCUMENTS

| | | | |
|---|---|---|---|
| 5,540,200 A | | 7/1996 | Naitoh et al. |
| 5,586,726 A | * | 12/1996 | Furuya ............... F02M 61/1813 239/533.12 |
| 7,059,547 B2 | * | 6/2006 | Kobayashi ................ B05B 1/14 239/533.12 |
| 7,100,848 B2 | * | 9/2006 | Kobayashi ......... F02M 51/0678 239/533.12 |
| 2003/0041844 A1 | | 3/2003 | Yoshimoto |
| 2003/0116660 A1 | | 6/2003 | Angelino et al. |
| 2004/0074472 A1 | | 4/2004 | Wirth et al. |
| 2006/0169804 A1 | | 8/2006 | Pontoppiddan |
| 2006/0231065 A1 | | 10/2006 | Pontoppidan |
| 2009/0057446 A1 | * | 3/2009 | Hung ................ F02M 61/1853 239/533.12 |
| 2009/0242668 A1 | * | 10/2009 | Higuma .................. B21K 1/20 239/584 |

FOREIGN PATENT DOCUMENTS

| | | |
|---|---|---|
| JP | 93227 C | 0/1931 |
| JP | S61-23836 A | 2/1986 |
| JP | 4-58377 B2 | 9/1992 |
| JP | 4-125666 U1 | 11/1992 |
| JP | 5-24955 U | 4/1993 |
| JP | H07-233767 A | 9/1995 |
| JP | 10-2268 A | 1/1998 |
| JP | 10-9094 A | 1/1998 |
| JP | 11-13598 A | 1/1999 |
| JP | H11-173245 A | 6/1999 |
| JP | 2003-074440 A | 3/2003 |
| JP | 2004-052732 A | 2/2004 |
| JP | 2004-52751 A | 2/2004 |
| JP | 2004-132225 A | 4/2004 |
| JP | 2004-332657 A | 11/2004 |
| JP | 2005-2840 A | 1/2005 |
| JP | 2007-231852 A | 9/2007 |
| JP | 2008-255834 A | 10/2008 |
| JP | 2008-255908 A | 10/2008 |
| JP | 2009-281274 A | 12/2009 |
| JP | 6002431 B2 | 10/2016 |

OTHER PUBLICATIONS

Supplementary European Search Report issued in EP Application No. 13 85 6418 dated Mar. 17, 2016.
Notification of Reason(s) for Refusal issued in corresponding Japanese Patent Application No. 2015-542370 dated Jul. 24, 2018 (in English and Japanese).
Communication pursuant to Article 94(3) EPC issued in corresponding European Application No. 13 856 418.2-1007 dated Apr. 11, 2018.
Notification of Reason(s) for Refusal dated Sep. 5, 2017 in Japanese Patent Application No. 2015-542370.
Decision of Refusal dated Jun. 18, 2019 in Japanese Patent Application No. 2015-542370.
International Search Report dated Apr. 29, 2014 issued in PCT/IB2013/002592.

* cited by examiner

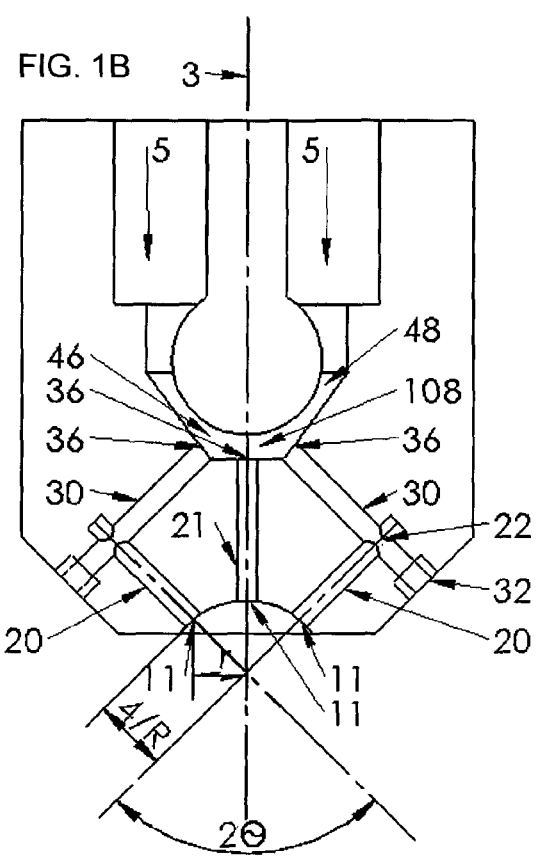

A B C
D E F

LIQUID INJECTOR ATOMIZER WITH COLLIDING JETS

CROSS REFERENCE TO RELATED APPLICATIONS

The present invention is a '371 of International Patent Application No. PCT/IB2013/002592, filed on Nov. 20, 2013, which, in turn, claims priority from U.S. Provisional Patent Application No. 61/728,525 filed on Nov. 20, 2012, U.S. Provisional Patent Application No. 61/838,675 filed on Jun. 24, 2013, and U.S. Provisional Patent Application No. 61/891,118 filed on Oct. 15, 2013. The contents of all of the aforementioned applications are incorporated herein by reference.

FIELD OF THE INVENTION

The present invention is directed to an apparatus and method for creating an atomized liquid. More particularly, the present invention is directed to an atomizing liquid injector for internal combustion engines.

BACKGROUND

Achieving effective atomization of liquids for injection into reciprocating or rotary internal combustion engines is an important aspect of the design and operation of spark-ignition, compression-ignition (diesel) or continuous combustion engines. Prior art methods include the use of very high pressures, use of very small orifices, and use of impingement plates or small cylindrical obstacles that break up a stream of liquid.

Achieving effective atomization of liquids for cooling, knock reduction, NOx reduction in reciprocating or rotary internal combustion engines is an important aspect of the design and operation and provides significant advantages with respect to increased fuel economy and lowered emissions.

Both liquid fuels and water are typically injected-into engines. Fuels can be diesel-type fuels, gasoline (petrol), alcohols, and mixtures thereof. Diesel-type fuels include JP-8, jet fuel, and kerosene. Alcohols include ethanol and methanol, which are commonly blended with gasoline. Water is also often injected into engines to provide an internal cooling effect, knock, NOx reduction and because of the large coefficient of expansion provided by liquid water converting to steam during combustion, particularly if there is net reduction in heat lost through external cooling and exhaust.

Modern engines typically use fuel injection to introduce fuel into the engine. Such fuel injection may be by port injection or direct injection. In port injection fuel injectors are located at some point in the intake train or intake manifold before the cylinder. In direct injection, an injector is in each cylinder.

Atomization of fuels and other liquids injected into cylinders is important. Optimally, any injected liquid is atomized prior to contact of the stream of injected liquid with any interior surface of the engine. If liquid contacts cylinder surfaces, it can wash away lubricants and pool, resulting in sub-optimal combustion. Pooled fuel during combustion causes carbon deposits, increased emissions, and reduced engine power. Alternatively, when water is injected, the impingement on non-lubricated internal surfaces, such as cylinder head and piston face, can provide some benefits.

The spray configuration in conventional fuel injectors or atomizers is typically cone-shaped, often with swirling, but this configuration is limited and can result in impaction of liquids on the piston and cylinder walls in direct injection systems. Particularly in high compression engines, the head space is very limited, making atomization in such engines more difficult without contact of streams of liquid on engine internal surfaces.

An approach to effective atomization is the use of high pressure liquid injection and small orifices, but high pressure systems are expensive and prone to failure, and small orifices are prone to clogging.

Also an approach to effective atomization is to use air shear with the liquid, where high pressure fast moving air is used to shear a liquid stream to achieve atomization. This approach has its own limitations in terms of breaking the liquid droplets. Additionally, its application in direct injection configuration is difficult, if not impossible, because of complexities involved with providing air or gas at high pressures.

Colliding jets are also well known in liquid fueled rocket engines, as a means of mixing the fuel and the oxidizer together. Injectors for internal combustion engines differ from prior art rocket engine nozzles in that rocket engine nozzles are not 'start-hold-stop' type metered devices, whereas injectors for internal combustion engines are designed to deliver, on command, a specific quantity of a liquid. This requires careful control over the flow rate over time, which is traditionally achieved via a solenoid, but can also be controlled via hydraulic pilot actuation, hydraulic amplification, piezo-electric stack, pneumatic means, or other methods. Moreover, colliding jets in rocket engines are primarily intended as a mixing method, in which two separate fluids (typically, a fuel and oxidizer) are injected to interact and react, rather than as a mechanism purely to break apart fluids into droplets or an atomized spray.

Conventional atomizers and injectors use high pressure to force liquids through a small orifice. The kinetic energy provided by application of pressure is therefore used almost entirely for acceleration of the fluid and any break up or atomization occurs due to air shear, resistance or drag. It is clear from observation as well as theory that the jet will travel substantial distance before the break up begins. In internal combustion engines with limited chamber dimensions, about 10 cm in most passenger cars, the 'liquid length' or the length of the jet before the break up is higher than the farthest point from the injector tip in a combustion chamber. This means the jets will impinge either the piston or the cylinder wall or both before the break up. A new mechanism is needed to achieve better breakup

SUMMARY OF THE DISCLOSURE

Figure 8A:
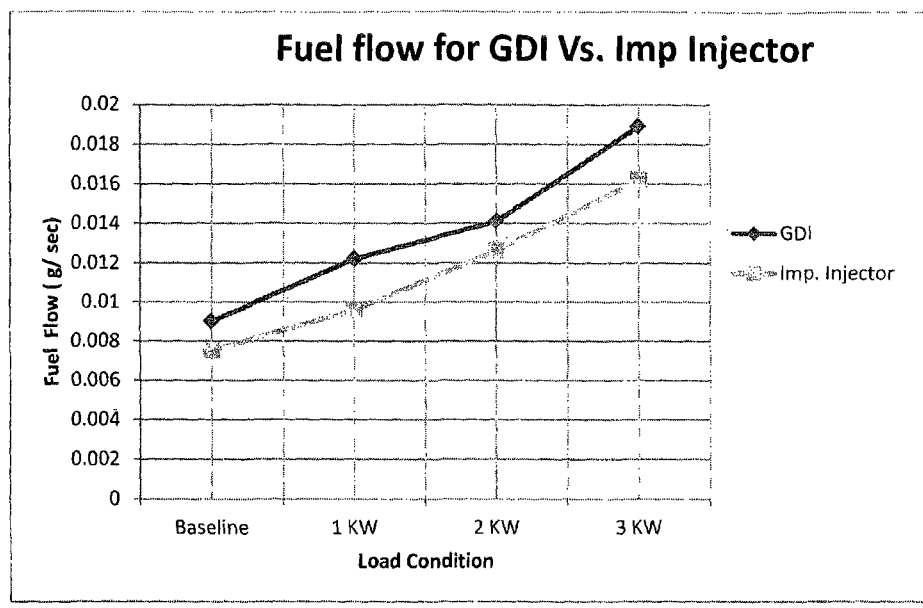
Figure 8B:
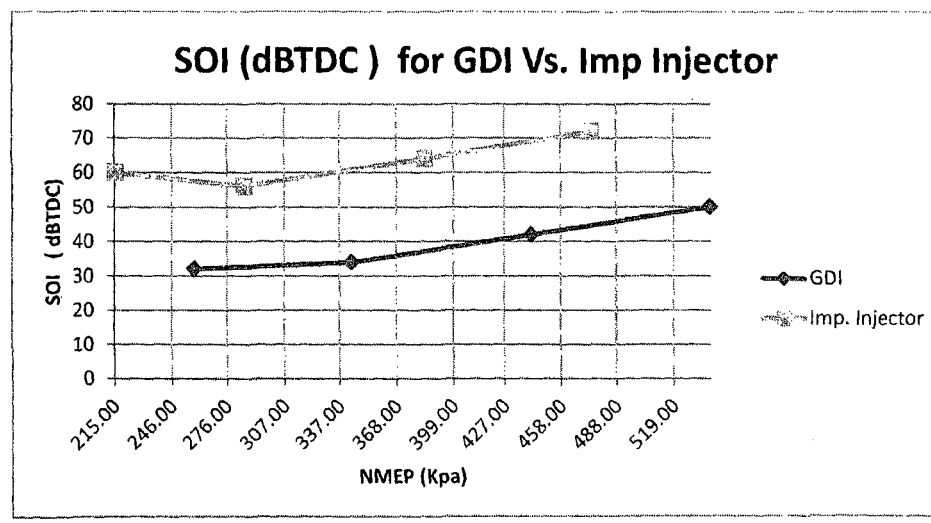

An embodiment of the present invention includes: an injector housing; a liquid inlet configured to be coupled to an external source of liquid; a pintle valve in fluid communication with the liquid inlet, the pintle valve being configured to adjustably meter a flow of liquid from the external source of liquid; and a plurality of liquid passages in fluid communication with the pintle valve and terminating at respective inclined orifices formed at a spray-tip exterior surface of the injector housing, the liquid passages being dimensioned and inclined to direct respective jets of liquid to a common collision point located at a defined position distant from a plane on which the inclined orifices are formed. The defined position is located along a central axis of the atomizing injector at a distance from the exterior surface determined to minimize or avoid impact of atomized liquid backward on the exterior surface of the atomizing injector and less than the lowest of the liquid length distance satisfying either the equation L=d×m×SM, where d is the inclined orifice diameter in m, m is a constant and SM is a dimensionless coefficient defined by $(\nu/\sigma)\times(2\Delta P\times\rho)^{1/2}$, where ν is kinematic viscosity in $m^2/s$, σ is the surface tension in N/m, ΔP is the pressure drop across the inclined orifice in $N/m^2$, and ρ is the fluid density in $kg/m^3$ or the equation L $(A_o\times\Delta P)/[\sigma+C\times d_o\times\Delta P/\rho_L]$, $C=(\rho_a\pi C_{dc}/3)$, where $d_o$ is inclined orifice diameter in m, $A_o=\pi d_o^{2/4}$ is orifice area in $m^2$, ΔP is pressure drop across the inclined orifice in $N/m^2$, σ is surface tension in N/m, $\rho_L$ is liquid density in $kg/m^3$, $\rho_a$ is air density in $kg/m^3$ and $C_{dc}$ is skin friction drag coefficient for cylinder in axial flow.

An embodiment of the present invention is manufactured by boring first liquid passages extending from an external surface of an injector body to a pintle valve seat, disposed in a cavity formed in the injector body; boring second liquid passages extending from the spray tip external surface of the injector body to intersect the first liquid passages at a non-end region of the respective first liquid passages, the second liquid passages terminating at orifices formed on the spray tip external surface of the injector body and inclined at an angle configured to direct jets exiting the orifices to collide at a defined point external of the injector body; and sealing the first liquid passages between the external surface of the injector body and the intersection of the first and second passages.

In an embodiment, the liquid injector injects liquids into an internal combustion engine. In an embodiment, the liquid injector injects liquids into a combustion chamber of a reciprocating or rotary internal combustion engine. In an embodiment, the liquid injector injects liquids into an intake port, intake manifold, or exhaust path of a reciprocating internal combustion engine.

In an embodiment, the orifices on the exterior of the nozzle are arrayed at the same radial distance from the central axis of the nozzle, and are equiangularly spaced.

In an embodiment the orifices may be arrayed at the same radial distance from the central axis of the nozzle, and not equiangularly spaced. In an embodiment, the nozzle may define a concave section on the exterior end, and the jet orifices are within the concave section, In an embodiment, the angle defined by a line from an orifice to the central axis point at the exterior end of the nozzle to an adjacent orifice is equal for all orifices on any plane.

In an embodiment, an additional orifice is provided at the center of the nozzle.

In an embodiment, the number of orifices is more than two, and may range up to fifty orifices. Fluid dynamics indicates that liquid jets from two orifices will give a flattened fan shaped diffusion cloud after collision, but three or more orifices will give a three dimensional rounder cloud. Larger numbers of orifices will have a greater output of liquid (all other factors being equal). In engine applications, for example, an injector body for a car engine may have a diameter of about 8 mm and have 2-6 orifices. An injector for a stationary heavy diesel engine may have an injector body that is about 5 cm in diameter and have 3 to 30 or more orifices.

In an embodiment, the injector is a fuel injector or water injector in an internal combustion engine. In an embodiment, the liquid in the injector is selected from an aqueous solution, water, and a liquid hydrocarbon fuel. In an embodiment, the injector is a fuel injector and the liquid is selected from diesel fuel, JP8, alcohol or gasoline or mixture thereof.

In an embodiment, the metering means is a solenoid controlled pintle or a piezo-electric controlled pintle.

In an embodiment, the jets are not all of equal inlet pressure or orifice diameters and collision velocity or force.

In an embodiment, the orifice diameter may range from about 50 μm to about 5000 μm, or larger, depending on the flow rate required. In an embodiment, the orifice diameter ranges from about 200 μm to about 400 μm and the liquid is a hydrocarbon fuel. In an embodiment, the orifice diameter ranges from about 300 μm to about 700 μm and the liquid is water or an aqueous solution.

In an embodiment, the liquid pressure ranges from about 1 bar, to about 5,000 bar.

In an embodiment the velocity of the liquid at the orifice, which defines each jet, is greater than 10 m/s, and in another embodiment, ranges from about 20 to about 500 m/s.

In an embodiment the distance between the orifice and the collision point is smaller than 3 times the distance between the two orifices furthest from each other.

In an embodiment the distance between the orifice and the collision point is shorter than the 'liquid length' of the liquid jet.

In an embodiment, the angle defined by any two jets ranges from about 20° to about 180°.

In an embodiment, the injector of the present invention may have two or more focal points where there are at least two jets meeting at each focal point. Thus, an embodiment provides a liquid injector that produces an atomized liquid having a pressurized source of a liquid feed to a body of the injector, wherein the body has a liquid inlet, a liquid metering means inside or outside the body, and a liquid outlet comprising a nozzle; wherein the nozzle comprises two or more jet orifices from which pressurized liquid jets of the liquid originate, wherein each jet is aimed at a focal point external to the injector, wherein the collision of pressurized liquid jets at the focal point creates an atomized form of the liquid, wherein there are two or more discrete focal points; wherein the metering means provides a precise quantity of liquid flow at a precise start and stop time.

BRIEF DESCRIPTION OF THE DRAWINGS

These and other features, aspects, and advantages of the present invention will become better understood with regard to the following description, appended claims, and accompanying drawings wherein:

FIG. 1A illustrates a schematic embodiment of the present invention.

FIG. 1B illustrates the schematic of FIG. 1A but with the pintle in the open position.

FIG. 2 illustrates a view of the inventive injector from a bottom-up view in FIG. 1A.

FIGS. 3A-F illustrates various orifice patterns.

FIG. 4 shows the geometric schematic of a liquid jet up to breakup;

FIG. 5 A-C is an example of results from the model from which is derived the expression for the jet length up to breakup based on force equilibrium leading to satisfaction of the condition of jet breakup;

FIG. 6A through 6E illustrate a manufacturing process of an embodiment of the present invention.

FIGS. 7A and 7B show spray patterns from an actual prior art injector (FIG. 7A) and the inventive injector (FIG. 7B).

FIGS. 8A and 8B are plots of fuel flow engine load for diesel engine, showing that the inventive injectors have a lower fuel flow than conventional injectors for the same engine load.

DETAILED DESCRIPTION

The present invention provides a nozzle for the injection of fluids, particularly liquids for injection into reciprocating or rotary internal combustion engines. Such liquids may be fuels, such as gasoline or diesel, water, or aqueous solutions. In the present invention, at least two or more jets of the fluid, under pressure, are aimed at a collision point. The collision of the jets at the collision point(s) efficiently atomizes the liquid. The atomized liquid creates a plume that minimizes substantial contact of liquids with interior engine surfaces and provides a large surface area for more efficient combustion (or other effects).

Two colliding jets produce a fan-like, two-dimensional atomized spray. At least a third colliding jet is required to achieve a fully three-dimensional cloud. By configuring the jets at various angles, including a jet in the center, the atomized cloud of liquid can be shaped.

In an embodiment of the present invention, a liquid injector is provided that produces an atomized liquid with a pressurized source of a liquid fed to a body of the injector, wherein the body has a liquid inlet, a liquid metering means, and a liquid outlet comprising a nozzle; wherein the nozzle comprises two or more jet orifices from which pressurized liquid jets of the liquid originate, wherein each jet is aimed at a common focal point external to the injector, wherein the impingement of pressurized liquid jets at the focal point creates an atomized form of the liquid; wherein the included angle of the jets is between 30° and 180°; and wherein the metering means provides a precise quantity of liquid flow at a precise and controllable start and stop time.

In another embodiment, a liquid injector is provided that produces an atomized liquid having a pressurized source of a liquid fed into a body of the injector, wherein the body has a liquid inlet, a liquid metering means within the body, and a liquid outlet comprising a nozzle, and wherein the body has a generally circular cross section with a central axis; wherein the nozzle comprises the central axis, an interior end, and an exterior end, wherein two or more passages originate from the interior end, wherein each passage terminates at the exterior end with an orifice; wherein the pressurized liquid is forced through the two or more passages to the orifice terminating each passage, where each orifice directs a jet of the pressurized liquid, wherein the orifices are configured such that each jet is aimed at a common focal point external to the injector, wherein the impingement of pressurized liquid jets at the focal point creates an atomized form of the liquid; wherein the included angle of the jets is between 30° and 180°; and wherein the metering means provides a precise quantity of liquid flow at a precise and controllable start and stop time.

In an embodiment of the present invention a liquid injector includes a liquid inlet; a liquid metering means for providing a quantity of liquid flow; and a liquid outlet having a nozzle. The nozzle includes a central axis; an interior end; an exterior end or spray tip, and two or more passages originating from the interior end, each passage terminating at the exterior end with an orifice, the orifices being configured such that at least two jets are aimed at a common focal point external to the injector.

The metering means may be a solenoid controlled pintle. Alternatively, the metering means may be a piezo-electric controlled pintle.

The nozzle of the present embodiment defines a concave or indented conical section on the exterior end. The jet orifices are within the indented section. The orifices may be arrayed at the same radial distance from the central axis of the nozzle, and equiangularly spaced. Alternatively, the orifices may be arrayed at the same radial distance from the central axis of the nozzle, and are not equiangularly spaced. The jet orifices may be arrayed on a single plane relative to the central axis of the nozzle. Alternatively, the centers of the jet orifices are arrayed on two or more planes relative to the central axis of the nozzle.

In the present embodiment, the liquid injector injects liquids into a combustion chamber of a reciprocating internal combustion engine or a combustion chamber of a rotary internal combustion engine.

In the present embodiment a pressurized liquid is forced through the at least two or more passages to the orifice terminating each passage, each orifice directing a jet of the pressurized liquid, the collision of the pressurized liquid jets at the focal point creating an atomized form of the liquid.

FIGS. 1A and 1B are schematic depictions of an embodiment of the inventive nozzle with two liquid passageways are seen in the plane of view. A nozzle is a device designed to control the direction or characteristics of a fluid flow (especially to increase velocity) as it exits (or enters) an enclosed chamber or pipe. The nozzle has a body 1 with central axis 3. The inlet end 5 of the nozzle depicts the terminal end of the pintle shaft 40 and pintle ball 42. The liquid passageways, which transmit pressurized liquids in the nozzle to the orifices, originate at point 36 in the pintle ball seat area.

The outlet end 6 (also termed herein the "spray-tip") of the nozzle 1 has an indent 7 which is depicted in FIG. 1 as concave (i.e., with a curved profile, rather than edges with straight walls), but may also be conical in profile. The jet orifices 10 are situated within the indent 7. The included angle of the jets (20) can be large, greater than 90°, while still keeping the jet path length, i.e., the distance along line 4 from 10 to focal point 2, also denoted as R, relatively short. A shorter jet path length provides better control of the atomization process and more energy delivered to the collision point 2. Thus, shorter jet paths are more desirable, subject to avoiding back impaction, i.e., droplets reflected back to the injector body and impacting the injector spray tip.

Each liquid passageway in the embodiment depicted in FIGS. 1A and 1B is formed from the combination of liquid passages 30 and 20. In the embodiment shown in FIGS. 1A and 1B, subpassage 30 is formed by drilling a hole in the nozzle body 1 from beveled edge 64 at point 32 to point 36 in the pintle valve seat 46. Section 34 is then plugged. Subpassage 20 is formed by drilling a hole in the indent 7 from point 10 that intersects subpassage 30 at intersection 22.

The orifices 10 may have in insert 11 to narrow the opening to a smaller diameter than the internal diameter of subpassage 20. This may be especially desirable because the orifice size will be tuned according to various factors, such as the viscosity of the liquid, the pressure, the speed (e.g., rpm's of the engine), which affects the shape and other features of the atomization of the inventive nozzles. While the orifice size may be tuned to different purposes, there are practical limits to drilling holes in the nozzle blank. Drilling holes smaller than 500 microns may be very expensive, which is not desirable for a mass produced item. Thus, a larger diameter passageway that is inexpensive to fabricate can be made, but the orifice can be a much smaller diameter depending on the specific application of the nozzle, which may be a substantially smaller diameter that would be very expensive if the entire passageway was that diameter.

The pintle is a reciprocating shaft in a sleeve in the injector. The end of the pintle valve 42 at the nozzle is a rounded bulbous portion, termed the pintle ball. In the default position, the pintle ball is pressed against the valve seat 46. When the pintle ball is pressed against the valve seat 46, no liquid can flow into the outgoing passages 30, and no liquid flows out of the nozzle. When the pintle ball 42 is shifted to the open position (FIG. 1B) by the solenoid or piezo-electric mechanism, the pressurized liquid flows through the space defined as 48 in FIG. 1A and into the outgoing passages 30 and out of the nozzle at jet orifices 11.

The valve seat 46 and pintle ball 42 define a 'sac' volume 108, which must be as small as possible, subject to proper entry conditions for the outgoing passages 30. Each of the outgoing passages 30 is in liquid communication with the 'sac' volume 108 at a first end, and terminates at a respective orifice exit at a second end. Outgoing passage 21 forms a single central jet directed along the central axis (line 3) of the injector, and outgoing passages 20 form inclined jets with included collision angle $2\theta$. Angle $2\theta$ can be fixed at angles of between about 30° and 180°. The plurality of jets emanating from orifices at the end of passages 20 and central passage 21 are directed to collide at a single focal point (i.e. collision point) 2.

Figure 2:
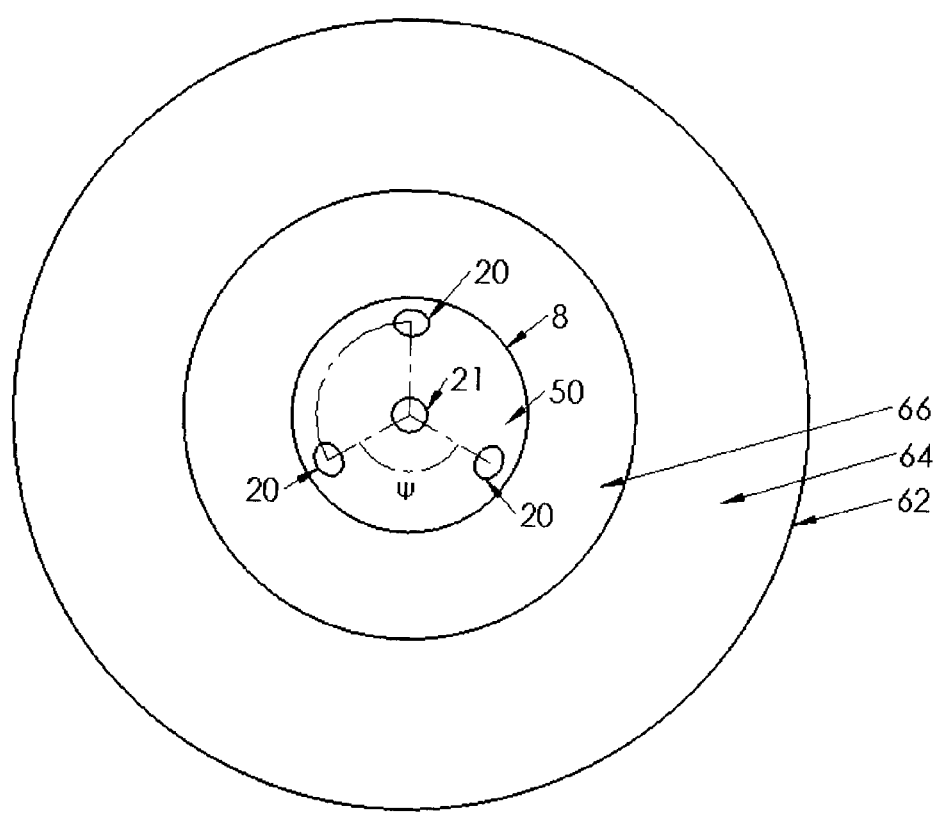

FIG. 2 is an end view of FIG. 1A looking towards the spray tip of the injector. Depicted are outer injector body wall 62, beveled edge 64, bottom surface 66, and ring 8, which defines indent 7 (shown in the figures as concave). Central orifice 21 is shown, as are three radial orifices 20. The angle between each orifice, in the plane of centers of orifices 20 is $\Psi$. As illustrated by way of an example in FIG. 2, the radial orifices 20 are equiangularly spaced 120° apart. Dimension r defines the distance of the radial orifices to the central axis in the plane of centers of orifices 20. As shown here, there is an orifice along the central axis, but a central orifice is optional in this invention.

Referring to FIGS. 1A and 1B, by varying the distance R angles $\theta$ can be varied, as $R=r/\sin\theta$. If r is short for a given R and closer to the central axis, $\theta$ will be smaller. Alternatively for a given r, larger R will result in smaller $\theta$ and vice versa. The smallest included angle $2\theta$ will be about 30°. By making r longer, and drilling passages 20 as perpendicular as possible to the face of indent 7, the included angle $2\theta$ can approach 180°. In an embodiment, the included angle $2\theta$ is 180°.

In an alternative embodiment (not shown) outgoing passages 20 and may be inclined to collide at different focal points, thus producing two separate collision points.

Figure 3:
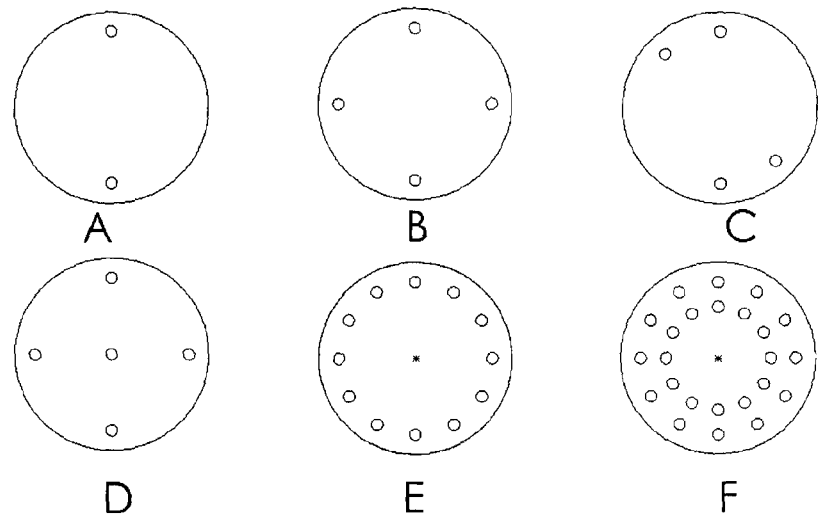

In another embodiment, two (or more) rings of radial orifices 20 may be provided, wherein a first set of orifices has a certain r dimension, and a second set of orifices as a different r dimension, wherein all of the orifices are aimed at a single collision point. FIG. 3 shows various nonlimiting patterns of orifices that may be employed in the instant invention.

The inventive injectors may be used for the injection of hydrocarbon fuels, water, aqueous solutions, or mixtures thereof directly into the combustion chamber of an engine, or into the intake train (intake manifold, also termed port injection), or into the exhaust train (exhaust manifold) of an engine.

The pressure applied to the liquids of the inventive injectors varies depending on the location of the injector in the engine and the type of liquid. For port injection applications with an injector situated to inject fluids into the intake manifold, the pressure may be 4 to 5 bars, but in an embodiment, much higher pressures may be employed in port injection with the inventive injectors, up to 250 bars. For direct injection applications, with the injectors situated on each cylinder to inject directly into the combustion chamber of the cylinder, the pressure for gasoline engines is about 100 bar to about 250 bar. For diesel-type fuels used with compression ignition (diesel) engines, the pressure is about 250 bar to about 2500 bar in very high pressure engines. In some embodiments, lower pressures may be employed to achieve effective atomization than are typical for conventional fuel injectors.

In order to create the atomized form of the liquid the injector of the present invention is configured to control several parameters including orifice diameters, collision velocity, liquid pressure, and collision angle, collision length, for example. The values of the controlled parameters are selected based on the particular liquid being injected in order to generate sufficient energy at the collision point to atomize, and partially vaporize, the liquid. The following description and referenced figures provide details regarding the selection of the values for the various parameters necessary to construct the present invention.

Compressed fluids, such as, air, gas, water or liquid fuels, possess a specific potential energy, or SPE, where $SPE=\Delta P/\rho$ ($\Delta P$ is the pressure drop across a fuel nozzle in $kN/m^2$, and $\rho$ is the fluid density in $kg/m^3$). Accordingly, $SPE=\Delta P/\rho=kJ/kg$. Thus, for water at 300 bar pressure difference and density of 1000 $kg/m^3$, SPE=30 kJ/kg. When expanded ideally this will result in a jet velocity of $v=(2\Delta P/\rho)^{1/2}=(60000)^{1/2}=245$ m/s.

When two or more such jets collide, small regions of high pressure stagnation recovery (at 50% recovery, about 150 bar) are created and a small portion of the energy will cause a small fraction of the liquid in the jet to vaporize, creating a very powerful additional mechanism of disintegration, in addition to shear and turbulence disintegration mechanisms. As compared to water, which has the largest latent heat, other liquid fuels, such as gasoline or diesel, will exhibit a significantly improved atomization at significantly lower pressures and higher orifice diameters.

It is important to note that the velocities of the liquid jets exiting the conventional injectors, especially direct injectors, are magnitudes greater than the speed of the piston. This means even if the injection happens at bottom-dead-center (BDC), the liquid jet will impinge on the piston face or if angled, the cylinder walls. It is also important to note that the "liquid length" of such jets is typically greater than the stroke length of the piston, which almost ensures that there is liquid impingement on the cylinder walls and/or piston face. Such impingement is undesirable and leads to loss of efficiency.

The present invention is directed to maximizing the vaporization of the liquid jet, by having the two or more jets colliding at a specific focal point, and taking into consideration variables that have not been considered heretofore, such as angles of the jets; the diameter of the droplets in the jets, the amount of pressure applied to the jets, the liquid length before collision of the liquid jets, and the like. These various approaches are described herein below.

Figure 4:
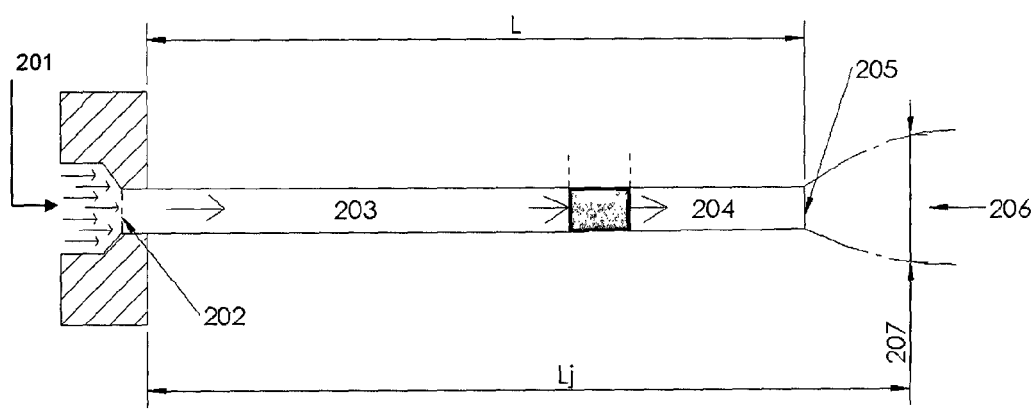

The liquid length ("L") is defined as the distance a jet of liquid travels before it starts breaking apart into droplets. This is illustrated in FIG. 4, which generically depicts a jet stream of pressurized liquid exiting an orifice as it decomposes from air shear and other forces without a collision with another jet or a surface. In FIG. 4, a pressurized liquid forced through inlet 201 to the nozzle orifice 202 creates a jet stream 203 with diameter $d_o$ at the jet orifice. Liquid jet 203 with diameter $d_j$ gradually tapers off through portion 204 to point 205, where the jet has essentially disintegrated and the spray plume 206 has formed. Dimension L is the distance from 202 to 205. The length $L_j$ extends from orifice exit to point 207, where the spray cone diameter ($d_{spray}$) 207 is about 3 to 5 times $d_o$.

The shorter the distance the liquid has to travel before the collision, the greater the atomization, as more kinetic energy is available for a stronger collision. Thus, the injector design process must consider the geometric aspects of incorporating an optimum length of the jet up to the collision point in relation to overall injector layout.

Liquid length can be mathematically defined by the following equation L/d/SM=m (Constant), where SM=(ν/σ)×(2ΔP×ρ)$^{1/2}$, and d is the orifice diameter. The new non-dimensional number SM is a coefficient. Alternatively, the liquid length L can be expressed as L=m×SM×d. In practice a more general equation may be used for a particular pressure range of interest: L/d=(L/d)$_o$+m×SM. Here, (L/d)$_o$ is a constant to be determined experimentally.

If the value of the constant m is assumed to equal 1/0.09157=10.921, as available in the experimental data in prior art, then L/d can be estimated for any pressure ΔP through SM, as indicated in the last column of Table 1. However, experiments suggest that this analysis may be valid only for very small values of jet velocity or pressure difference ΔP. Moreover, as the values predicted by m=10.921 are too low for ΔP=1 bar, the constant m has to be determined for each liquid by required control experiments.

A theory called "Jet Length Momentum Model", based on first principles can solve the problem, of prediction of liquid jet length before breakup. Estimation of Pre-Breakup Length requires that 'Condition for Breakup of liquid Jet' is conceptually formulated. Refer to FIG. 4, where $d_o$—orifice diameter; $A_o$—orifice area=π$d_o^2$; $\rho_L$—density of liquid; $\rho_a$—density of air; ΔP—pressure drop across the orifice; $V_j$—jet velocity at orifice exit=$(2\Delta P/\rho_L)^{1/2}$; σ—surface tension of the liquid; L is jet length up to breakup; $C_{dc}$—skin friction drag coefficient for a cylinder in axial flow.

Consider an element of jet of length dx at a distance x from orifice exit plane. The mass of this element is $m_e$=$A_o$×$\rho_L$×dx with change in velocity dV across dx. The rate of change of momentum of the element ($m_e$×dV/dt) is a force in the flow direction that is opposed by the surface tension force (σ×dx) and the aerodynamic friction force (½$\rho_a$ π$d_o$×dx×$C_{dc}$×$V^2$). The breakup is imagined to occur at such jet length when the integrated opposing force just exceeds the driving momentum force. The acceleration (dV/dt) is substituted as (V×dV/dx) and it is assumed that the jet velocity V varies linearly from $V_j$ at orifice exit (x=0) to 0 at breakup point (x=L) or V=$V_j$ (1−x/L). The force equilibrium equation [$m_e$×dV/dt=(σ×dx)+(½$\rho_a$ π$d_o$×dx×$C_{dc}$×$V^2$)] takes the form: $A_o\rho_L$VdV=σ×dx+(½$\rho_a$ π$d_o$×$C_{dc}$×$V_j^2$)(1−x/L)dx, which can be integrated between the boundary conditions V=Vj at x=0 and V=0 at x=L at breakup to yield: $A_o$×ΔP=σL+$\rho_a$ π$d_o$×$C_{dc}$×(ΔP/$\rho_L$)×L/3.

The final expression for Jet Length up to breakup is: L=($A_o$×ΔP)/[σ+C×$d_o$×ΔP/$\rho_L$], where C=($\rho_a\pi C_{dc}$/3). For $C_{dc}$~0.0 the above equation simplifies to L=$A_o$×ΔP/σ.

It is interesting to note that for two liquids, such as Water and Diesel, operating with orifices of equal diameter $d_o$, there will be a common injection pressure $\Delta P_c$, when the jet lengths up to breakup will equal: $\Delta P_c$=($\sigma_w$−$\sigma_D$)($\rho_w$×$\rho_D$)/[C×$d_o$×($\rho_w$−$\rho_D$)].

The skin friction drag coefficient $C_{dc}$, which is an input based on empirical/experimental data, can be cross checked or estimated independently based on: $C_{dc}$=3×($\sigma_w$−$\sigma_D$)($\rho_w$×$\rho_D$)/[$\rho_a$π×$d_o$×$\Delta P_c$×($\rho_w$−$\rho_D$)].

Based on the above model computations are made for water and diesel for $d_o$=0.3 mm and assumed values of $C_{dc}$ from for a sample range of pressures ΔP. Example results for ΔP=1 to 100 bar and $C_{dc}$=0.0, 0.05 and 0.1 are presented in FIG. 5A to 5C.

It is an aspect of the present invention that the colliding jets will substantially or entirely reduce the forward penetration of the liquid jet whereby the liquid, or spray plume length is always shorter than either the stroke length or the distance between the piston face and the injector nozzle. It is also an aspect of the present invention that the breakup of the jets occurs close to the injector, with a sufficient amount of kinetic energy, imparted to the liquid by virtue of the application of pressure, being directed to the atomization of the liquid jets.

The energy required to atomize a liquid is governed by the surface tension of the liquid. A force greater than the surface tension directed away from the direction of the movement of the liquid must be applied to achieve atomization. The energy, or work (W), required for atomization is given by W=σ×ΔA, where a is surface tension and ΔA is the area created due to atomization. The specific energy of the jet is given by the total available specific energy (TASE), which is expressed by TASE=ΔP/ρ. The energy used for the atomization, responsible for the breakup away from the direction of the movement of the jet, is given by EOBU=(ΔP/ρ) sin$^2$θ, where θ is the angle formed between the jet and the axis formed by the collision point and the direction of the movement of the plume or the injector body. For

TABLE 1

Estimation of (L/d) by L/d = m × SM model: m = 10.921 and (L/d)$_o$ = 0
$d_o$ = 0.3 mm, ΔP = 1.0 bar, Bond number $B_o$ = ($\rho g d_o^2$)/σ = 0.0122 << 1*

| Liquid | ν (m$^2$/s) × 10$^6$ | σ (kN/m) | ρ (kg/m$^3$) | $V_j$ (m/s) | Oh × 10$^3$ | Re | We | SM | L/d |
|---|---|---|---|---|---|---|---|---|---|
| Diesel | 3.50 | 28.9 | 830 | 15.52 | 1.173 | 1330.5 | 2076.1 | 3.121 | 34.1 |
| Kerosene | 1.30 | 24.3 | 780 | 16.01 | 0.181 | 3695.3 | 2469.1 | 1.336 | 14.6 |
| Ethanol | 1.48 | 22.5 | 788 | 15.93 | 0.256 | 3229.3 | 2666.7 | 1.652 | 18.0 |
| Petrol | 0.80 | 22.0 | 760 | 16.22 | 0.074 | 6083.3 | 2727.3 | 0.897 | 9.8 |
| Water | 1.00 | 72.6 | 998 | 14.16 | 0.046 | 4246.9 | 826.4 | 0.389 | 4.3 |

*indicates that gravity effects can be ignored smaller angle θ, the jets will meet at a further distance than for a larger angle and therefore higher energy or pressure would be required to achieve atomization.

The energy can also be expressed using the velocity of the jets. The velocity in the direction of propagation is given by $V=(2\Delta P/\rho)^{1/2}$, where $\rho$ is the density of the liquid. The theoretical velocity of the initial jet can be calculated using the above equation, and the velocity of the jets after the collision can be calculated based on conservation of momentum. Further atomization after the collision can be calculated using equations relating to turbulent shear and drag.

An aspect of the present invention is to produce droplets smaller than 5 microns, and in another embodiment, smaller than 1 micron in diameter. The area of atomized droplets from a solid jet, and droplets per unit mass or volume can be calculated, as well as the energy required to produce such anatomization, using the above equations.

Therefore, the present invention generates atomization using at least two jets colliding at a point where the theoretical energy available away from the direction of the jets or EOBU, is higher than the break up energy required to produce droplets smaller than 5 microns, where the pressure applied to the liquid and the angle formed by the jet with the collision point and the axis produces energy greater than the amount of energy calculated based on the equation $EOBU=(\Delta P/\rho)\sin^2\theta=\sigma \times \Delta A$. In another embodiment, the present invention generates atomization using at least three jets colliding at a point where the theoretical energy available away from the direction of the jets or EOBU is higher than the break up energy required to produce droplets smaller than 5 microns, where the pressure applied to the liquid and the angle formed by the jet with the collision point and the axis produces energy greater than the amount of energy calculated based on the equation $EOBU=(\Delta P/\rho)\sin^2\theta=\sigma \times \Delta A$. In still another embodiment, the present invention generates atomization using at least two jets colliding at a point where the theoretical energy available away from the direction of the jets or EOBU is higher than the break up energy required to produce droplets smaller than 1 micron where the pressure applied to the liquid and the angle formed by the jet with the collision point and the axis produces energy greater than the amount of energy calculated based on the equation $EOBU=(\Delta P/\rho)\sin^2\theta=\sigma \times \Delta A$. In another embodiment, the present invention generates atomization using at least three jets colliding at a point where the theoretical energy available away from the direction of the jets or EOBU is higher than the break up energy required to produce droplets smaller than 1 micron where the pressure applied to the liquid and the angle formed by the jet with the collision point and the axis produces energy greater than the amount of energy calculated based on the equation $EOBU=(\Delta P/\rho)\sin^2\theta=\sigma \times \Delta A$. FIG. 10—contour map If 1 mL of a liquid is atomized to produce droplets of diameter D (μm) then the area created due to atomization $\Delta A=6/D$ in $m^2$. The energy required to overcome the surface tension will be $6\sigma/D$ in J, where the surface tension $\sigma$ is in N/m. The energies, EOBU, required for 1 mL of various liquids such as gasoline, diesel, alcohol or water are estimated and provided in Table 3 below.

Table 2 gives the properties of these liquids and Table 3 gives EOBU per mL of liquid when atomization produces droplets of diameter D μm. Energy required to completely evaporate one gram of liquid EOEV is also given in Table 3. Total available specific energy at various injection pressures from 0.4 to 4000 bar for these liquids is given in Table 4. Table 5(a) and 5(b) respectively give required injection pressures at various collision angles from 30 to 90 deg to provide sufficient energy for breakup (i.e., atomization) and evaporation.

TABLE 2

Liquid Properties: ν is kinematic viscosity; σ is surface tension; ρ is fluid density

| Liquid | ν (×10⁶) m²/s | σ (×10³) N/m | ρ kg/m³ | $h_{fg}$ kJ/kg | Cp kJ/kg/K | BP ° C. |
|---|---|---|---|---|---|---|
| Diesel | 3.50 | 28.9 | 830 | 418.7 | 1.80 | 188-340 |
| Ethanol | 1.48 | 22.5 | 788 | 1658.1 | 1.549 | 78 |
| Petrol | 0.80 | 22.0 | 760 | 628.1 | 2.010 | 27-225 |
| Water | 1.00 | 72.6 | 998 | 2257.4 | 4.187 | 100 |

TABLE 3

Specific Energy of Breakup and Evaporation for Selected Liquids

| Liquid | EOBU (J/mL) D = 5 μm | EOBU (J/mL) D = 1 μm | EOBU (J/mL) D = 0.1 μm | EOEV (J/gm) |
|---|---|---|---|---|
| Diesel | 0.0347 | 0.1734 | 1.734 | 730.1 |
| Ethanol | 0.027 | 0.135 | 1.35 | 1755.7 |
| Petrol | 0.0264 | 0.132 | 1.32 | 652.2 |
| Water | 0.0871 | 0.4356 | 4.356 | 2613.3 |

TABLE 4

Total Available Specific Energy TASE (J/gm) at various pressures

| ΔP | Diesel | Ethanol | Petrol | Water |
|---|---|---|---|---|
| 0.4 | 48.2 | 50.8 | 52.6 | 40.1 |
| 4.0 | 481.9 | 507.6 | 526.3 | 400.8 |
| 40.0 | 4819.3 | 5076.1 | 5263.2 | 4008.0 |
| 400.0 | 48192.8 | 50761.4 | 52631.6 | 40080.2 |
| 4000.0 | 481927.7 | 507614.2 | 526315.8 | 400801.6 |

TABLE 5(a)

Differential Pressure (ΔP) required to overcome surface tension at various collision angles θ. (ΔP in bars)

| θ | Diesel | Ethanol | Petrol | Water |
|---|---|---|---|---|
| 30 | 7.668 | 5.970 | 5.837 | 19.263 |
| 40 | 4.640 | 3.612 | 3.532 | 11.656 |
| 50 | 3.267 | 2.543 | 2.487 | 8.207 |
| 60 | 2.556 | 1.990 | 1.946 | 6.421 |
| 70 | 2.171 | 1.690 | 1.653 | 5.454 |
| 80 | 1.977 | 1.539 | 1.505 | 4.966 |
| 90 | 1.917 | 1.493 | 1.460 | 4.817 |

TABLE 5(b)

Differential Pressure (ΔP) required to evaporate 1 gm at various collision angles θ. (ΔP in bars)

| θ | Diesel | Ethanol | Petrol | Water |
|---|---|---|---|---|
| 30 | 26858.0 | 61317.8 | 21969.5 | 115593.1 |
| 40 | 16250.9 | 37101.5 | 13293.1 | 69941.8 |
| 50 | 11442.1 | 26122.7 | 9359.5 | 49245.2 |
| 60 | 8952.7 | 20439.2 | 7323.2 | 38531.0 |

TABLE 5(b)-continued

Differential Pressure (ΔP) required to evaporate 1 gm
at various collision angles θ. (ΔP in bars)

| θ | Diesel | Ethanol | Petrol | Water |
|---|---|---|---|---|
| 70 | 7604.0 | 17360.2 | 6220.0 | 32726.5 |
| 80 | 6923.3 | 15806.0 | 5663.1 | 29796.7 |
| 90 | 6715.6 | 15331.8 | 5493.2 | 28902.8 |

It is apparent from the data in the above tables that, for a particular liquid, the choice of number of jets, injection pressure ΔP and collision angle θ have to be made to satisfy the requirements of atomization, plume shape, size and orientation.

It is important that the theoretical velocity of the liquid jet coming out of the nozzle is correctly estimated through the pressure as indicated in the above tables.

In the present invention, the collision point is as close to the orifice exit face as possible but must avoid back impact. Further, the collision jet length is shorter than the liquid length (L) of the jet coming out of the nozzle. If the diameter of the circle in the plane containing the centers of the orifices is $D_{oc}$, and the angle between the jet axis and the injector body axis is θ, then the collision length $L_c$ is determined as $L_c = D_{oc}/2 \sin \theta$. The collision point can be no further than 3 $D_{oc}$ from the orifice exit point. In another embodiment, the distance is less than 2 $D_{oc}$. Stated another way, the collision point is at a distance from the orifice shorter than the diameter of the circle intersecting the orifices or the distance between two orifices which are furthest apart.

The shorter the distance liquid has to travel before the collision, the more efficient the atomization, since more kinetic energy is available for a stronger collision.

Figure 5A:
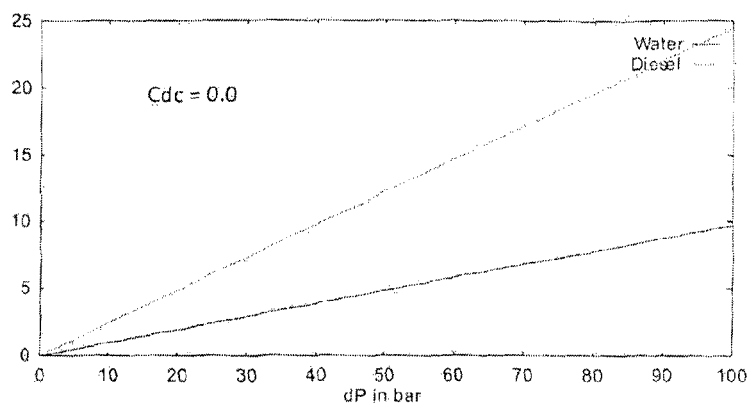
Figure 5B:
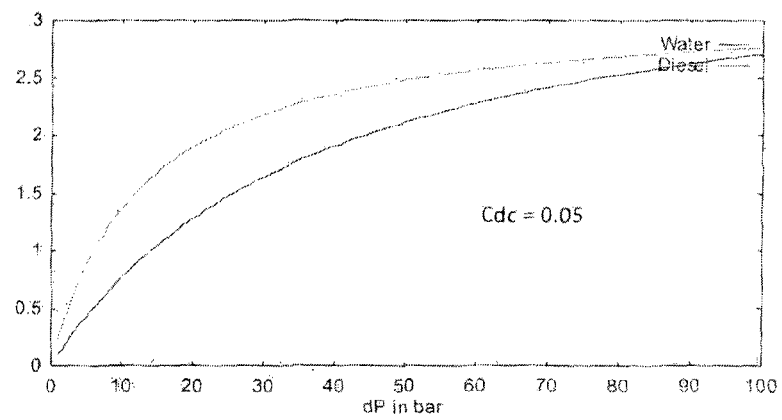
Figure 5C:
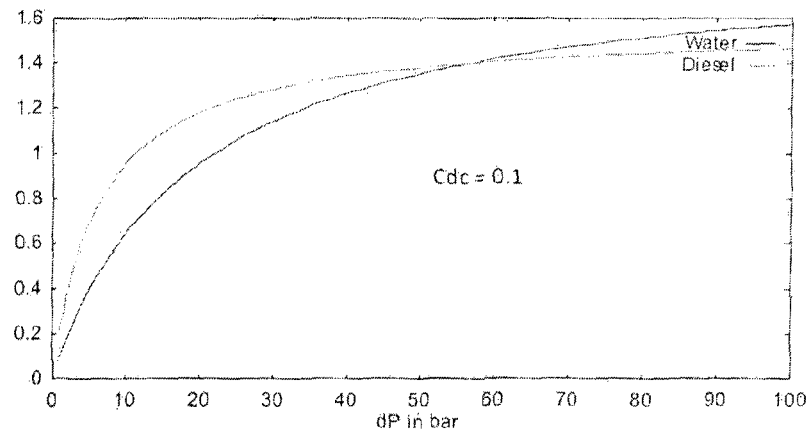

FIGS. 5A, 5B and 5C present computation of liquid jet lengths for water and diesel respectively for pressure drop variation from 1 to 100 bar by way of illustration only. Liquid jet lengths for any orifice diameter (50 to 1000 μm) can be computed from the relation that $L \propto d_{o2}$.

The present invention provides superior atomization to prior art methods in fuel or water injection for engines. In particular, the sharp inward angle of the jets provided by the inventive liquid passage configuration in the nozzle is a substantial improvement over prior art techniques providing very efficient atomization in close proximity to the injector body, and preventing streams of liquids from impacting interior solid surfaces in the engine, which can wash off oil and cause, inefficient combustion. This is particularly important in modern high compression engines, where injection timing close to top-dead-center (TDC) is important and the head space at TDC may be very small.

In an embodiment, atomization leads to formation of fine and uniform suspension of liquid into air (or substantial evaporation of water or fuel injected) and complete combustion as close to TDC, or inner-dead-center (IDC) for rotary engines, as possible in internal combustion engines. If sufficient pressures are applied, a substantial amount of liquid, fuel or water or any mixture thereof, including solution of solids into either water or fuel or mixture thereof will evaporate almost instantly.

The liquid injectors of the present invention useful for reciprocating as well as rotary internal combustion engines have a metering mechanism, such as a pintle valve, for controlling the quantity and/or timing of the fluid (for example, liquid fuel) into the reciprocating engine or a continuous flow control system for rotary engines.

The present invention provides superior atomization to prior art methods for fuel or water injection in internal combustion engines. In particular, the sharp inward angle (2θ>90°) of the jets provided by the liquid passage configuration in the nozzle is a substantial improvement over prior art techniques and provides very efficient atomization in close proximity to the injector body, and preventing streams of liquids from impacting interior solid surfaces in the engine, which can wash off oil and cause inefficient combustion. Thus, the injector design process must consider the geometric aspects of incorporating an optimum length of the jet up to the collision point in relation to overall injector layout.

The spray plume geometry may suitably match the gas space shape for better mixing. The spray plume is configured to not impact the inner metal walls for liquid fuels but may be made to impact un-lubricated hot surfaces in the case of water injection applications.

FIGS. 6A through 6E show the stages of manufacturing an embodiment of the present invention. Specifically, the manufacturing process begins with an injector body having a pintle valve 404 formed therein. At FIG. 6A, a plurality of first liquid passages 406, 408 are bored or drilled into the injector body 402 from an external surface 410 and inclined to terminate at the pintle valve 404. First liquid passage 408 is positioned along a central axis of the injector body, while first liquid passages 406 are disposed along a periphery of the injector body.

Figure 6A:
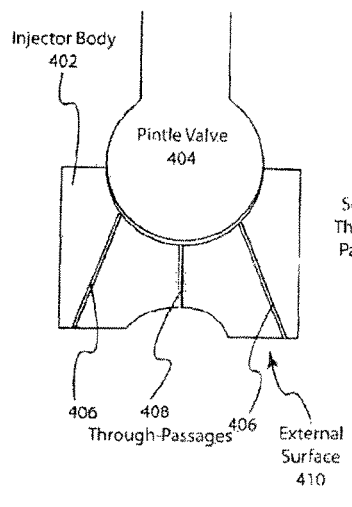
Figure 6B:
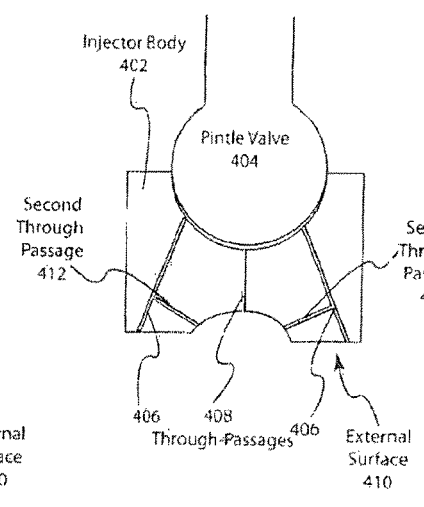
Figure 6C:
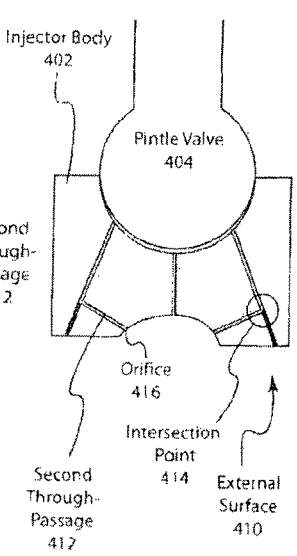

As shown in FIG. 6C, a second set of liquid passages 412 are bored through the external surface 410 of the injector body at an angle to intersect the first liquid passages 406 at an intersection point 414 away from either end of the first liquid passages 406.

As shown in FIG. 6C, a portion of the first liquid passages 406 between the external surface 410 and the intersection point 414, as indicated by 415, is sealed. The final injector of the present invention has a fluid path formed between the pintle valve 404 and orifices 416 formed at a distal end of the second liquid passages 412.

Figure 6D:
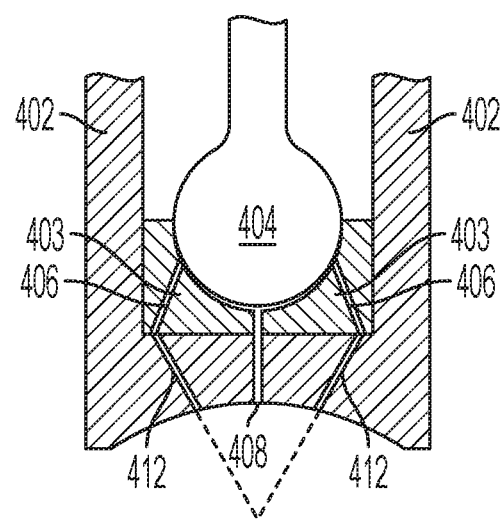

As shown in FIG. 6D, an embodiment of the present invention may be fabricated with a valve seat 403, for the valve 404, which is formed separately from the injector body 402. The valve seat 403 in the present embodiment has passages 406 drilled there through prior to the valve seat 403 being inserted into the injector body 402. The through passages 412 are also formed in the injector body 402 prior to insertion of the valve seat 403 into the injector body 402. When the valve seat 403 and the injector body 402 are joined, the through passages 406 are aligned with the through passages 412 as shown in FIG. 6D.

Figure 6E:
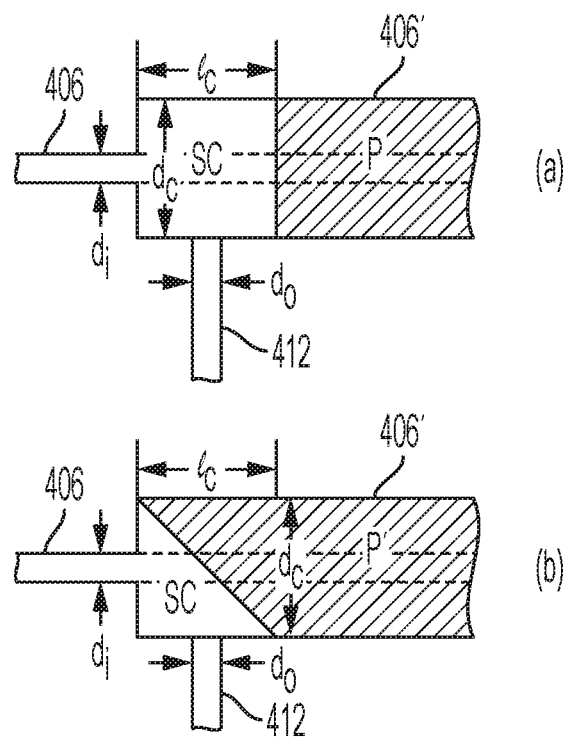

A close up of the intersection point 414, shown in FIG. 6C, is provided in FIG. 6E (a) and (b). As seen in FIG. 6E (a), the passages 406 have diameter $d_i$; the passages 412 have diameter $d_o$; the plugged passage portion is enlarged to diameter $d_o$ and forms a settling chamber SC of length $l_c$ by insertion of plug P; this helps increase the flow capacity of the orifice passages 412. The diameter $d_c$ is about 5 times $d_i$ and $l_c \approx d_c$. As seen in FIG. 6E (b) the plug P' can be chamfered at about 45° in another embodiment to increase the flow capacity. The liquid velocity reduces in the settling chamber SC about 5 times and the pressure increases in its square proportion. This significantly improves the liquid flow through orifice passages 412.

In an embodiment of the present invention, the orifices may have an insert to narrow the jet opening to a smaller diameter than the internal diameter of a subpassage (FIG. 1, item 11). This may be especially desirable because the orifice size can be tuned according to various factors, such as the viscosity of the liquid, the pressure, the speed (e.g., rpm of the engine), which affects the shape and other features of the atomization of the inventive nozzles. While the orifice size may be tuned to different purposes, there are practical limits to drilling holes in the nozzle blank. Drilling holes (for example, in passages 20 and 30) smaller than 500 microns may be very expensive, which is not desirable for a mass produced item. Thus, a larger diameter passageway that is inexpensive to fabricate can be made, but the orifice can be a much smaller diameter depending on the specific application of the nozzle, which may be a substantially smaller diameter that would be very expensive if the entire passageway was that diameter. In an embodiment, the nozzle is comprised of a unitary solid metal.

Within the context of the present invention, the term "unitary solid metal" connotes that the nozzle described in the foregoing paragraph may be fabricated from a single piece of metal. For example, the nozzle may be fabricated from a single block of stainless steel, which is a material sufficient to withstand the temperatures and pressures of an engine combustion chamber.

EXAMPLES

Example 1

The following are parameters of an example nozzle of the present invention, for example, as shown in the figures.

| Parameter | Unit | Conventional Injector Nozzle | Inventive Nozzle (2 or 3 jet nozzle) |
|---|---|---|---|
| Nozzle Outside Diameter | Mm | 7.5 ± 0.1 | 7.5 ± 0.1 |
| Pintle Ball Diameter | mm | 3 | 3 |
| Pintle Ball Seat Diameter | mm | 1.5 | 1.5 |
| Nozzle Shoulder - Seat Diameter | mm | 2.03 | 1.4 |
| Nozzle Bottom Face - Diameter | mm | 3.755 | 3.948 |
| Seat Diameter - Orifice Apex | mm | NA | 4.6 |
| Nozzle Bottom Face - Apex | mm | 1.397 | 1.3 |
| Nozzle Material | | Med Carbon Cast Stainless Steel | Stavax ESR (Modified 420 Stainless Steel) |

The following parameters refer to a 3-jet embodiment of the inventive nozzle in accordance with an embodiment of the present invention, for the injection of gasoline into the cylinder of an internal combustion engine.

| Parameter | value | Explanation |
|---|---|---|
| Nozzle Orifice Diameter | Φ 0.205 mm | Diameter of exit orifice defining a jet |
| Nozzle Orifice Length | 0.971 mm | |
| Orifice L/D | 4.73 | |
| Nozzle cone angle | 90° | 2θ in FIG. 1 |
| Nozzle orifice horizontal angle | 120° | Ψ in FIG. 2 |
| Nozzle distance from center | 0.80 mm | r in FIG. 2 |
| Supply hole diameter | Φ 0.25 mm | |
| Supply hole length | 3.16 mm | |
| Supply hole L/D | 12.64 | |

Figure 7:
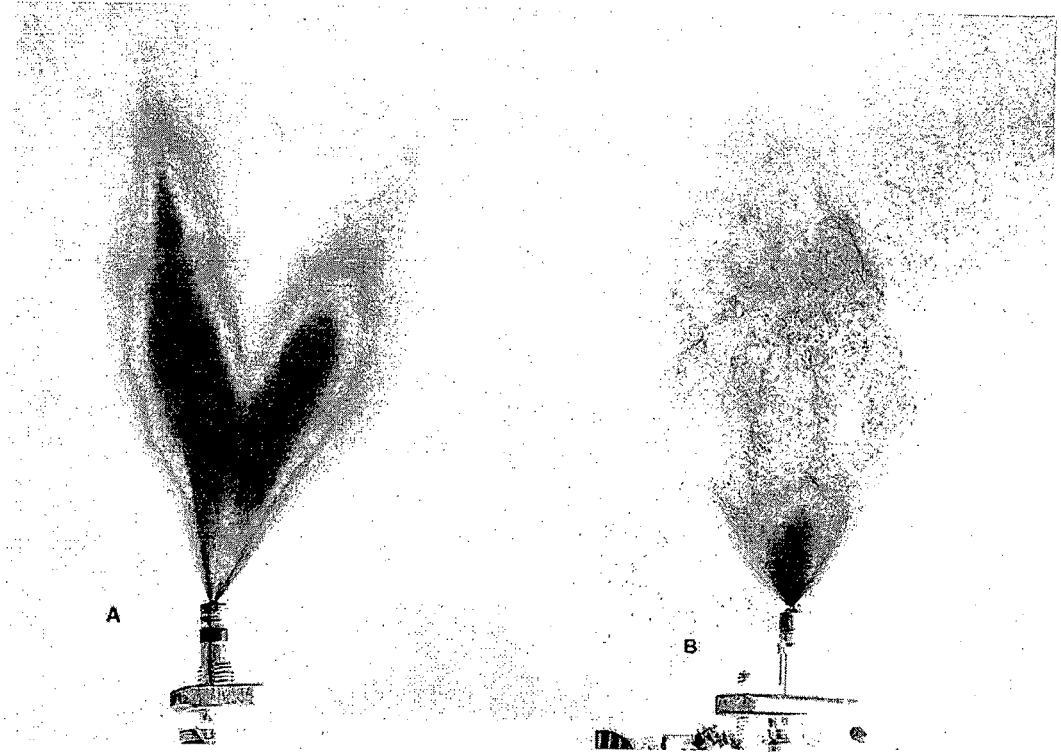

The spray pattern for this injector is illustrated in FIG. 7B, which is compared to a similar conventional injector (Bosch HDEV5 6-hole injector) shown in FIG. 7A. Both injectors were using water as the liquid, at 100 bar for 4 ms. The conventional injector (FIG. 7A) shows a coherent spray of liquid for a substantially greater distance from the injector than the inventive injector in FIG. 7B. The degree of atomization of the liquid is much greater in FIG. 7B, and it is clear that the stream breaks up in a much shorter distance than with the conventional injector.

Example 2

The inventive injectors have been demonstrated to improve engine efficiency as shown in FIGS. 8A and 8B. FIG. 8A a plot is shown of fuel flow vs. engine load for a 1.6 L 4-cylinder diesel engine. The data marked "GDI" is a conventional direct injector. The data marked "Imp. Injector" is the inventive 3-hole colliding jets injector. At various engine loads, the inventive injector demonstrates a 16-20% lower fuel flow than the conventional injector.

An explanation for the improved performance is shown in FIG. 8B. FIG. 8B shows the start of ignition (SOI) in degrees before top dead center (dBTDC) for the same engine load data points as shown in FIG. 8A. FIG. 8B shows that the start of ignition with the inventive injector (marked "Imp. Injector") occurs significantly earlier in the cycle than with the conventional GDI injector (e.g., 31° vs. 60° at the baseline data point). In addition, the engine output measured as normalized mean effective pressure (NMEP) is greater for each data point than for the corresponding data point with the conventional injector (e.g., 255 Kpa vs. 215 Kpa at the baseline data point). The earlier ignition suggests more complete combustion of the fuel, which may explain the improved efficiency.

This data also suggests that it may be important to modulate the injection timing with the inventive colliding jet injectors as compared to conventional injectors, since fuel ignition (at least in diesel engines) can occur earlier in the cycle due to the much greater surface area of the fuel in the cylinder just prior to ignition as a result of the improved atomization caused by the inventive injectors, and less (or non-existent) impact of fuel with interior surfaces of the engine.

What is claimed is:
1. A liquid injector that produces an atomized liquid comprising:
   a. a pressurized source of a liquid fed into a body of the injector, wherein the body has a liquid inlet, a liquid metering means within the body, and a liquid outlet comprising a nozzle, and wherein the body has a generally circular cross section with a central axis;
   b. wherein the nozzle comprises the central axis, an interior end, an exterior end, a concave or indented conical section on the exterior end, and a plurality of liquid passages, wherein each liquid passage is in fluid communication with a respective orifice within the concave or indented conical section of the nozzle from which pressurized jets of the liquid originate, wherein each jet is aimed at a common focal point external to the concave or indented conical section, wherein the collision of the pressurized liquid jets at the focal point creates an atomized form of the liquid, wherein each liquid passage comprises two sections, with a first section extending from the interior end outward from the central axis at an angle toward the exterior end, and a second section intersecting the first section and extending at an angle toward the central axis and the exterior end of the nozzle, wherein each liquid passage terminates at the exterior end with the respective orifice;

c. wherein each included angle of the jets is between 30° and 180°; and d. wherein the metering means provides a precise quantity of liquid flow at a precise and controllable start and stop time.

2. The injector of claim 1, wherein the orifices in fluid communication with the plurality of liquid passages, respectively, comprise three or more orifices.

3. The injector of claim 2, wherein one of the respective orifices defines a jet along the central axis of the injector.

4. The injector of claim 1, wherein the liquid injector injects liquids into an internal combustion engine.

5. The injector of claim 1, wherein the pressure applied to the liquid fed into the body of the injector is about 100 bar to 250 bar and the liquid is gasoline injected into a combustion chamber of a reciprocating or rotary internal combustion engine.

6. The injector of claim 1, wherein the pressure applied to the liquid fed into the body of the injector is about 200 bar to 2500 bar and the liquid is a diesel-type fuel injected into a combustion chamber of a reciprocating compression ignition combustion engine.

7. The injector of claim 1, wherein the liquid injector injects liquids into the intake manifold of an internal combustion engine.

8. The injector of claim 1, wherein the pressure applied to the liquid fed into the body of the injector is about 4 bar to about 250 bar and the liquid is port injected into the intake manifold of an internal combustion engine.

9. The injector of claim 1, wherein the liquid injector injects liquids into the exhaust manifold of an internal combustion engine.

10. The injector of claim 1, wherein the nozzle defines a concave section on the exterior end, and the jet orifices are within the concave section, and centers of the jet orifices are arrayed on a single plane perpendicular to the central axis of the nozzle.

11. The injector of claim 1, wherein the centers of the jet orifices are arrayed on two or more planes perpendicular to the central axis of the nozzle.

12. The injector of claim 1, wherein an orifice is provided at the center of the nozzle.

13. The injector of claim 1, wherein the number of the orifices, in fluid communication with the plurality of fluid passages respectively, is within a range of two to thirty.

14. The injector of claim 1, wherein the injector is a water injector and the liquid is an aqueous solution or water, or wherein the injector is a fuel injector and the liquid is a hydrocarbon fuel.

15. The injector of claim 1, wherein the metering means is a solenoid controlled pintle or piezo-electric controlled pintle.

16. The injector of claim 1, wherein the diameter of each orifice ranges from about 50 μm to about 3000 μm.

17. A nozzle for a liquid injector, comprising:

a. a cylindrical body that comprises a central axis, an interior end, an exterior end, a concave or indented conical section on the exterior end, and two or more liquid passages, wherein each liquid passage is in fluid communication with a respective orifice within the concave or indented conical section of the nozzle from which pressurized liquid jets of the liquid originate, wherein each jet is aimed at a common focal point external to the concave or indented conical section, wherein the collision of the pressurized liquid jets at the focal point creates an atomized form of the liquid, wherein each liquid passage comprises two sections, with a first section extending from the interior end outward from the central axis at an angle toward the exterior end, and a second section intersecting the first section and extending at an angle toward the central axis and the exterior end of the nozzle, wherein each liquid passage terminates at the exterior end with the respective orifice;

b. wherein each included angle of the jets is between 30° and 180°.

18. A nozzle for a liquid injector, comprising:

a. a seat for a pintle ball, the seat having at least two inlet orifices positioned thereon;

b. an outer surface having at least two outlet orifices positioned thereon; and c. at least two passages for transmitting a liquid from the inlet orifices to the outlet orifices, respectively, each passage comprising: a first linear passage extending from an edge of the outer surface to a respective inlet orifice of the at least two inlet orifices; a second linear passage extending from a respective outlet orifice of the at least two outlet orifices to an intersection point along the first linear passage; and a plug inserted into the first passage at the edge of the outer surface; and d. wherein each of the at least two passages and each of the at least two outlet orifices are oriented so that pressurized liquid transmitted through each passage forms a jet stream of pressurized liquid, wherein the nozzle comprises a concave or indented conical section at an exterior end of the nozzle, wherein the at least two outlet orifices are within the concave or indented conical section, wherein each jet is aimed at a common focal point external to the concave or indented conical section, wherein the collision of the pressurized liquid jets at the focal point creates an atomized form of the liquid, e. wherein the included angle of the jets is between 30° and 180°.

19. The nozzle of claim 17, wherein the orifices in fluid communication with the two or more liquid passages comprise a central outlet orifice provided at the central axis of the nozzle.

20. The nozzle of claim 17, wherein each of the orifices in fluid communication with the two or more liquid passages respectively has a diameter ranging from about 50 μm to about 3000 μm.

21. A liquid injector that produces an atomized liquid comprising:

a. a pressurized source of a liquid fed to a body of the injector, wherein the body has a liquid inlet, a liquid metering means, and a liquid outlet comprising a nozzle;

b. wherein the nozzle comprises four or more jet orifices from which pressurized liquid jets of the liquid originate, wherein the nozzle comprises a concave or indented conical section at an exterior end of the nozzle, wherein the four or more orifices are within the concave or indented conical section, wherein two of the pressurized liquid jets are aimed at a first common focal point external to the concave or indented conical section, and another two of the pressurized liquid jets are aimed at a second common focal point external to the concave or indented conical section, wherein the collision of pressurized liquid jets at the focal points creates an atomized form of the liquid, wherein the nozzle further comprises four or more liquid passages, wherein each liquid passage is in fluid communication with a respective jet orifice, wherein each passage comprises two sections, with a first section extending from an interior end of the nozzle outward from a central axis of the nozzle at an angle toward the exterior end, and a second section intersecting the first section and extending at an angle toward the central axis and the exterior end of the nozzle, wherein each passage terminates at the exterior end with a respective orifice;

c. wherein the included angle of any two jets aimed at the same focal point is between 30° and 180°; and d. wherein the metering means provides a precise quantity of liquid flow at a precise and controllable start and stop time.

22. A liquid injector that produces an atomized liquid comprising:
   a. an injector housing;
   b. a liquid inlet configured to be coupled to an external source of liquid;
   c. a pintle valve in fluid communication with the liquid inlet, the pintle valve being configured to adjustably meter a flow of liquid from the external source of liquid; and
   d. a plurality of liquid passages in fluid communication with the pintle valve and terminating at respective inclined orifices formed at an exterior surface of the injector housing, the liquid passages being dimensioned and inclined to direct respective jets of liquid to a common collision point located at a defined position distant from a plane on which the inclined orifices are formed,
   e. wherein the defined position is located along a central axis of the atomizing injector at a distance from the exterior surface determined to minimize impact of atomized liquid on the exterior surface and less than the liquid length distance satisfying the lesser of: $L = d \times C \times SM$ and $L = (A_o \times \Delta P)/[\sigma + K \times d \times \Delta P/\rho_L]$, $K = (\rho_a \pi C_{dc}/3)$, where d is the inclined orifice diameter, C is a constant, SM is a coefficient defined by $(\nu/\sigma) \times (\Delta P \times \rho)^{1/2}$, $\nu$ is kinematic viscosity, $\sigma$ is the surface tension, $\Delta P$ is the pressure drop across the inclined orifice, and $\rho$ is the fluid density, $A_o$ is an orifice area, $\rho_L$ is liquid density, $\rho_a$ is air density, and $C_{dc}$ is a skin friction drag coefficient for cylinder in axial flow.

23. A process for making an atomizing injector comprising:
   a. boring two or more first liquid passages extending from an external surface of an injector body to a pintle valve seat disposed in a cavity formed in the injector body;
   b. boring second liquid passages extending from the external surface of the injector body to intersect a respective first liquid passage at a non-end region thereof, the second liquid passages terminating at orifices formed on the external surface of the injector body and inclined at an angle configured to direct jets exiting the orifices to collide at a defined point external of the injector body, wherein the external surface of the injector body comprises a concave or indented conical section, wherein the orifices are within the concave or indented conical section, wherein the jets are aimed at a common focal point external to the concave or indented conical section; and
   c. sealing the two or more first liquid passages between the external surface of the injector body and the portions of the two or more first fluid passages where the two or more first fluid passages intersect with the second liquid passages, respectively.

24. A process for making an atomizing injector comprising:
   a. boring first liquid passages extending through opposing external surfaces of a valve seat, where one opposing external surface is formed into a seat for a pintle;
   b. boring second liquid passages extending from an external surface of a body of the injector to a surface forming a cavity for receiving the valve seat, the second liquid passages terminating at orifices formed on the external surface of the injector body and inclined at an angle configured to direct jets exiting the orifices to collide at a defined point, wherein the external surface of the injector body comprises a concave or indented conical section, wherein the orifices are within the concave or indented conical section, wherein the defined point is external to the concave or indented conical section;
   c. inserting the valve seat into the cavity;
   d. aligning openings of the first liquid passages with respective openings of the second liquid passages; and
   e. affixing the valve seat to the injector body.

25. The nozzle of claim 18, wherein the outlet orifice defining each jet has a smaller diameter than an interior diameter of the second linear passage.

26. The nozzle of claim 18, wherein the at least two outlet orifices have a diameter ranging from about 50 μm to about 3000 μm.

27. The injector of claim 1, wherein the common focal point is along the central axis of the body of the injector.

28. The injector of claim 1, wherein the included angle of the jets is between 30° and 150°.

* * * * *